Feb. 15, 1944.   R. H. FASH   2,341,536
METHOD AND APPARATUS FOR TREATING SUBSTANCES
Filed April 14, 1942   4 Sheets-Sheet 1
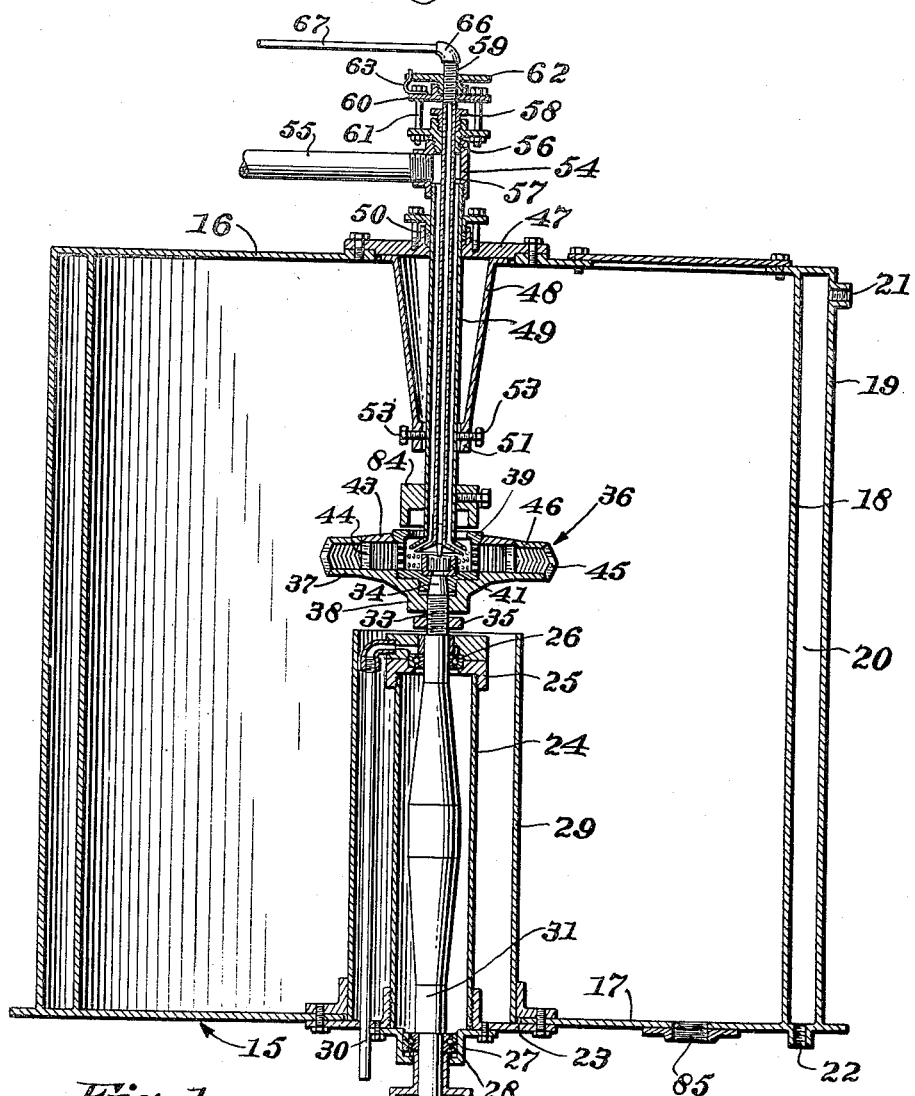
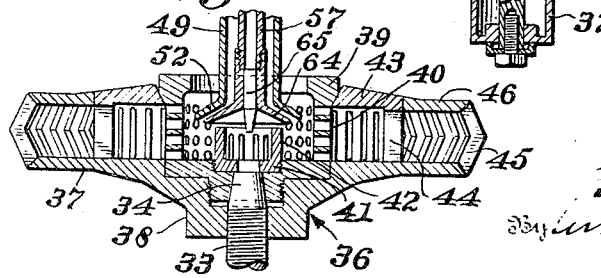
Inventor:
Ralph H. Fash,
Attorneys.

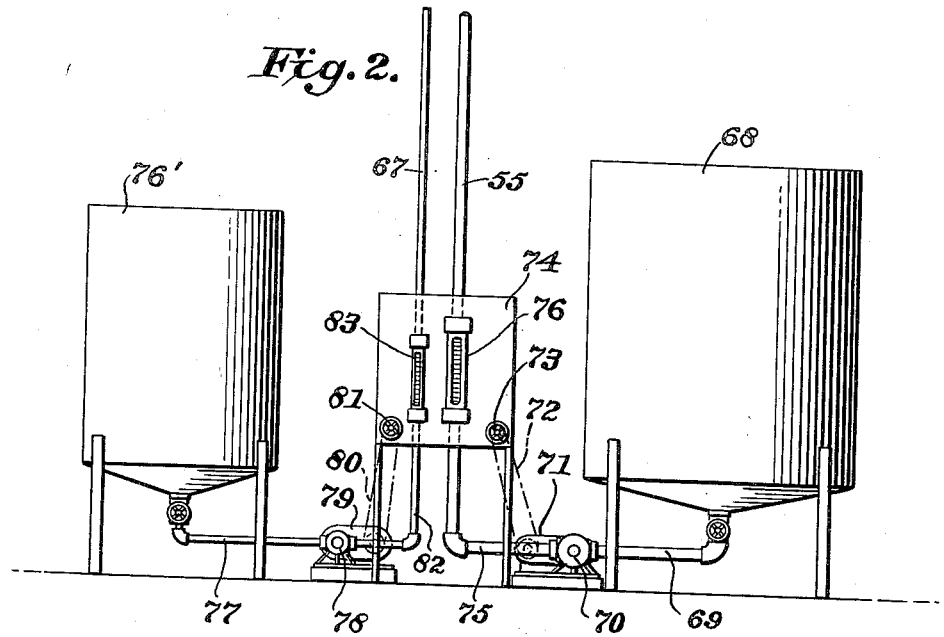
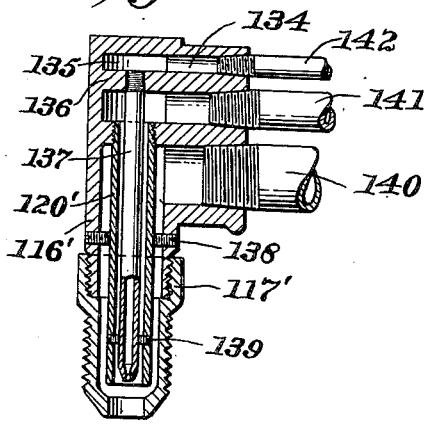

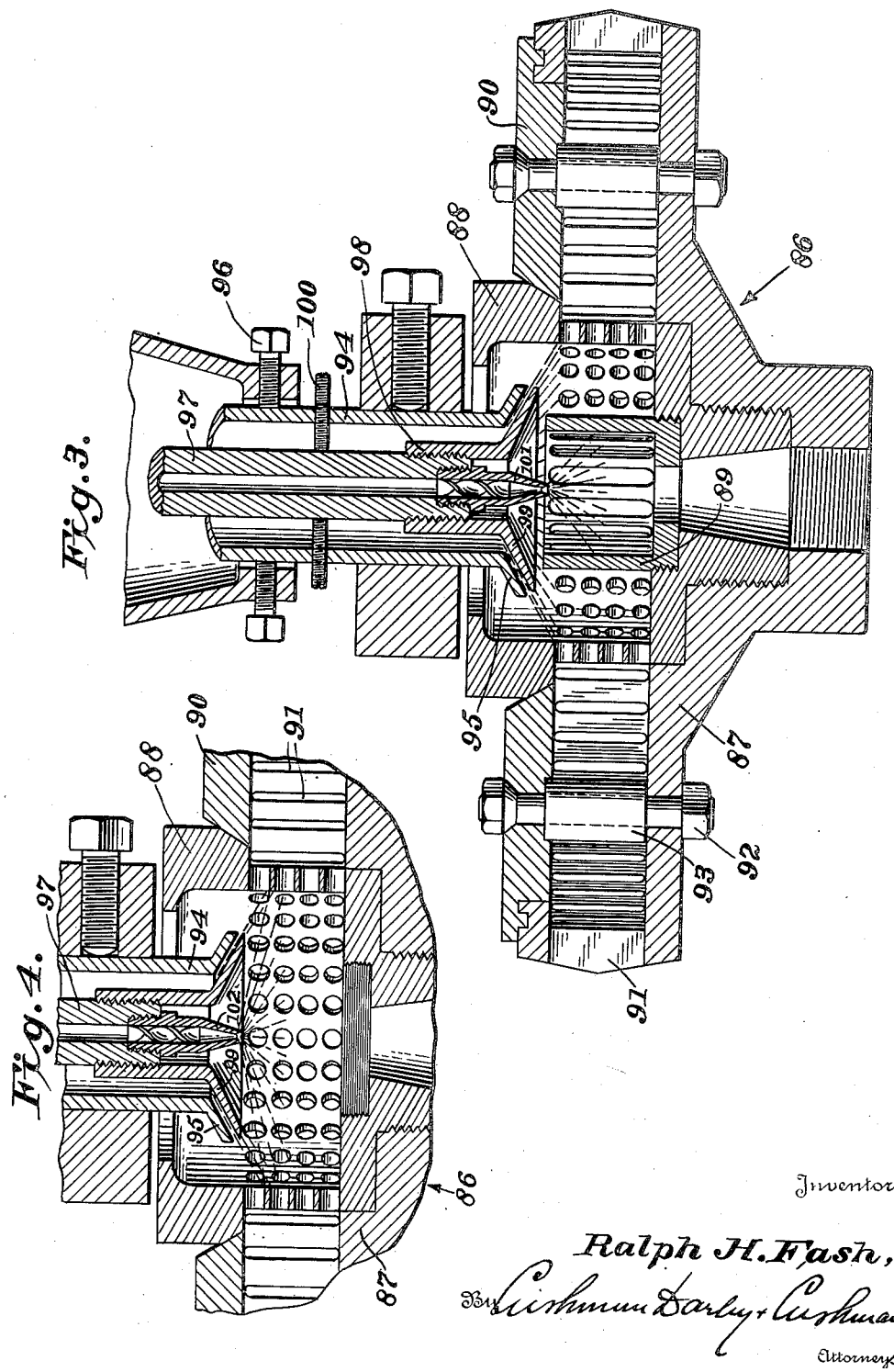

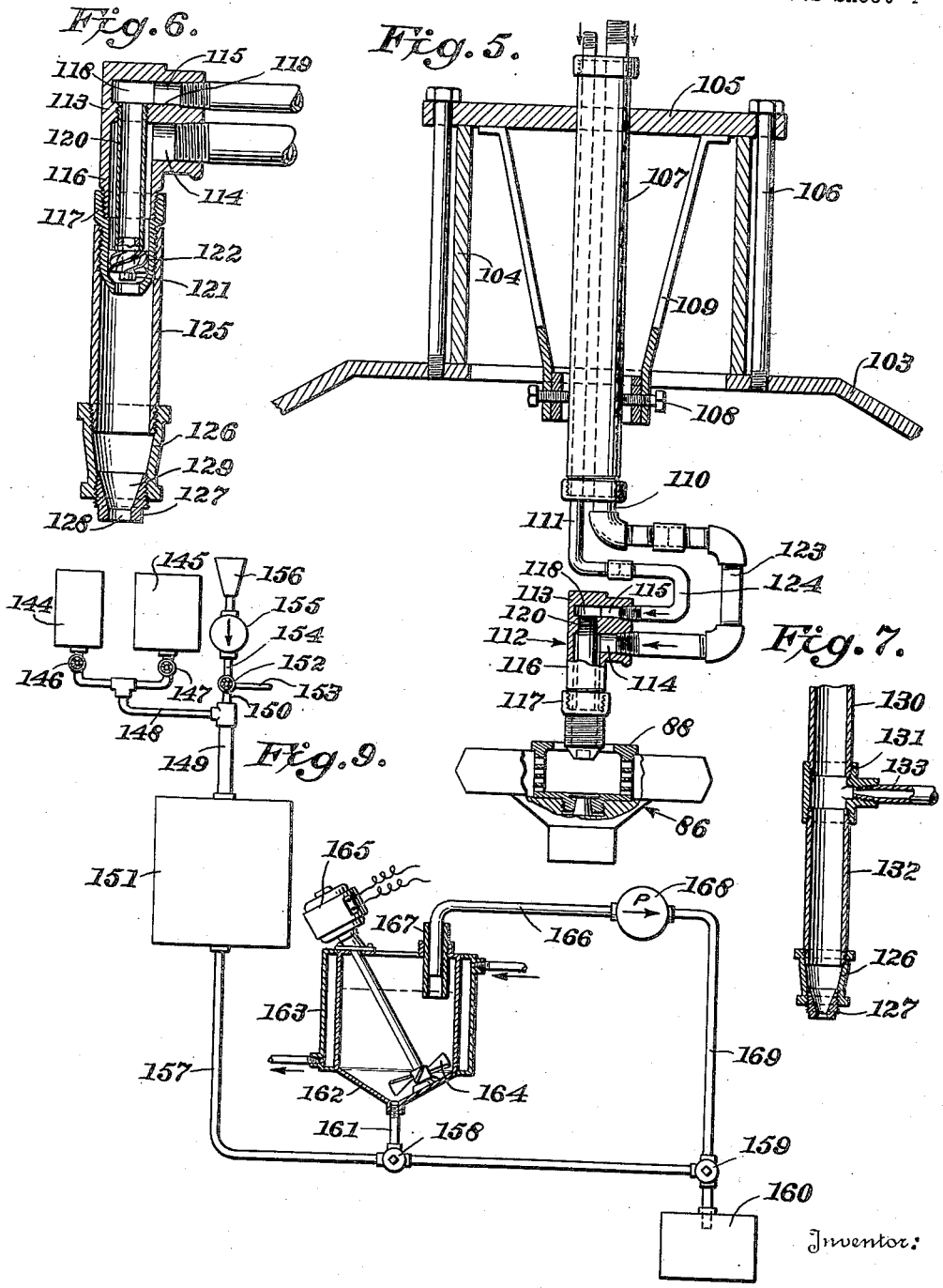

Patented Feb. 15, 1944

2,341,536

UNITED STATES PATENT OFFICE 2,341,536

METHOD AND APPARATUS FOR TREATING SUBSTANCES

Ralph H. Fash, Fort Worth, Tex., assignor, by mesne assignments, to Anderson, Clayton & Co., Houston, Tex., a corporation of Delaware Application April 14, 1942, Serial No. 438,954

40 Claims. (Cl. 259—96)

This invention relates to method and apparatus for mixing a plurality of substances in mist form. The invention is applicable where the substances to be mixed will react chemically with each other, or where they are inert, and can be used to produce an intimate mixture of one liquid with another, or with a gas, or with a solid, and in the latter case the solid will be in a highly dispersed form in a gas, such as air. In fact, any desired selection of liquids, gases, and solids may be mixed. The invention is usable to particular advantage where a small amount of one substance is required to be mixed with a large amount of another substance.

In order that the invention and the manner of practicing the same may be well understood, I shall describe its features with reference to the apparatus shown by way of example in the accompanying drawings, in which:

Figure 1 is a vertical section of mist-mixing apparatus, in accordance with the invention, shown as including a centrifugal atomizing and mixing head operatively disposed in a collecting chamber which also appears in vertical section.

Figure 1a is an enlarged section of the head of Figure 1.

Figure 2 is an elevation of apparatus by means of which substances may be supplied in regulated proportions to the apparatus of Figure 1.

Figure 3 is an axial section of a centrifugal atomizing and mixing head in the nature of that which appears in Figures 1 and 1a, but modified in certain particulars and shown on a larger scale.

Figure 4 is a partial section like that of Figure 3, but with a different relationship of certain parts.

Figure 5 is a view partly in vertical section and partly in elevation of mist-mixing means involving a different form of feed device for the centrifugal head from that of Figures 1, 1a, 3, and 4.

Figure 6 is an axial section of a feed device like that shown in Figure 5 provided with auxiliary equipment.

Figure 7 is an axial section of a further form of feed device.

Figure 8 shows in axial section a still further form of feed device, and

Figure 9 shows a refining system or the like including apparatus according to the present invention.

While, as above stated, the present invention has wide applicability so far as the nature of the substances to be mixed is concerned, the mixing of cottonseed oil and a refining agent, such as caustic soda, will be used as a prime example in the following description. It is common practice in the industry to mix the oil and an aqueous solution of caustic soda in the refining of cottonseed oil, but in previous commercial practices this mixture has always been effected with the reactants in liquid form throughout. The advantages of the present invention may be conveniently pointed out hereinafter by contrast with these prior liquid mixing processes of refining.

Referring to the drawings, and first to Figures 1 and 1a, reference numeral 15 designates generally a cylindrical chamber having top and bottom walls 16 and 17 and concentric inner and outer cylindrical walls 18 and 19 which define an annular cavity 20 in which a temperature conditioning medium may be circulated from an inlet 21 to an outlet 22. In the refining of cottonseed oil the conditioning medium will ordinarily be steam or hot water, for a purpose which will be hereinafter mentioned.

The bottom wall 17 has a central opening to the margins of which is secured a flange 23 which rigidly supports an upright tubular member 24 on whose upper end is threaded a horizontally split block 25 carrying a ball thrust and journal bearing assembly 26 on the vertical axis of chamber 15. Flange 23 has secured thereto a bearing housing 27 in which is disposed a ball thrust and journal bearing assembly 28 in alignment with assembly 26. Surrounding the housing 24 is a cylindrical guard 29 and between the two is disposed a lubricant supply pipe 30 by means of which lubricant is supplied to the upper bearing 26 from which excess can flow to the lower bearing 28.

Journaled and supported in the bearings 26 and 28 is a spindle 31 and on a portion of the spindle which projects downwardly beyond the bearing 28 is fixed a pulley 32. The spindle projects upwardly beyond the block 25 and includes a threaded portion 33 surmounted by a tapered extremity 34. Engaged with the threaded portion is a guard 35 for the upper bearing.

Reference numeral 36 designates generally a centrifugal atomizing and mixing head of suitable type. This head includes a lower disc portion 37 having a hollow downwardly projecting central boss portion 38 threaded on the threaded portion 33 of the spindle. Threaded in the cavity of the boss portion 38 is an upwardly open basket 39 having a tapered central opening in its bottom wall mating with the tapered extremity 34 of the spindle. Basket 39 has a circular wall or ring portion 40 provided with a multiplicity of circular radial apertures as here shown, the ring being coaxial with spindle 31. The bottom of the basket has a threaded circular recess in which is threaded the bottom portion of a basket 41 which has a circular wall portion or ring 42 coaxial with spindle 31 and provided with a multiplicity of radial slits or slots, the top of basket 41 terminating about midway of the perforated zone of basket 39.

Engaged between the flat upper face of disc 37 and the outer margins of an upper annulus 43, which closely embraces the top portion of basket 39, is a circular series of blades 44 concentric with the baskets and defining a multiplicity of radial apertures. A further concentric series of blades 45 joins the outer edge of disc 39 and the outer margin of an annulus 46, which fits tightly against annulus 43, the blades defining between them a multiplicity of radial openings. As here shown, the blades 45 are of relatively flat V-section, in elevation, with apices pointed outwardly.

A cover plate 47 closes a central opening in the top wall 16 of chamber 15 and rigidly carries a depending yoke 48. A tube 49 extends through a central opening of plate 47 and a packing gland 50 associated with the latter, and loosely through a ring portion 51 at the bottom of yoke 48, and at its lower end has a downwardly flared annular flange 52 overlying basket 41 within basket 39. The ring portion 51 of yoke 48 has threaded therein a number of radial screws 53 by means of which the lower portion of the tube 49 can be adjusted into true alignment with spindle 31. Also, these screws serve to hold tube 49 in the required position of vertical adjustment.

Threaded on the upper end of tube 49 is a T 54 into which is laterally connected a supply pipe 55. Threaded in the upper end of T 54 is a plug 56 having an axial bore through which extends a tube 57 in coaxial relation with tube 49. The plug has a packing gland 58 above which tube 57 is threaded at 59. A plate 60 is supported on a flange of plug 56 by means of spacers 61 and has a central opening through which the threaded end of tube 57 passes. Swivelled on plate 60 is a disc 62 having a threaded central opening engaging the threads 59, the disc having a notched edge engageable by a spring 63 to hold the disc in the required position of angular adjustment. Obviously, by rotating disc 62 in the appropriate direction, tube 57 can be adjusted upwardly and downwardly.

At its lower end, tube 57 has threaded thereon a fitting including an annular downwardly flared flange 64 which lies within the flange 52 in coaxial relation therewith, and by vertically adjusting either tube, the spacing of the two flanges may be determined. The two flanges together constitute a conical nozzle adapted to deliver a hollow conical film or spray to a desired zone of ring 40, to the outside of ring 42. By vertically adjusting both tubes the zone of delivery of the nozzle can be vertically adjusted. Tube 57 carries a central nozzle 65 adapted to deliver a conical spray in a certain circumferential zone of ring 42. Nozzle 65 is threaded into tube 57 and, consequently, is susceptible of vertical adjustment relative to the latter for the purpose of varying its delivery zone relative to that of the conical nozzle. Ordinarily, nozzle 65 is the type to deliver a hollow conical film or spray within the ring 42, although it is also contemplated that the nozzle might merely direct a stream to the bottom of the basket. Connected into the top of tube 57 through an elbow 66 is a supply pipe 67, which, as here shown, is considerably smaller than the supply pipe 55.

Referring now to Figure 2, reference numeral 68 designates a tank containing cottonseed oil, according to the present example, this tank being connected by a bottom pipe 69 with a pump 70 driven by a motor, not shown, through a speed control device 71 which, through a chain 72, is controllable from a hand wheel 73 on a control board 74. The pump output is led through a pipe 75 and through a flow meter 76 on the control board to supply pipe 55 which goes to tube 49. By observing the flow meter and appropriately adjusting the hand wheel 73, the oil delivery can be accurately controlled.

Reference numeral 76' designates a tank containing an aqueous solution of caustic soda, according to the present example. A pipe 77 connects the bottom of the tank with a pump 78 driven from a motor, not shown, through a speed control device 79 which, through a chain 80, is controllable from a hand wheel 81 on the board 74. Pump 78 delivers through a pipe 82 and a flow meter 83 to the supply pipe 67 which goes to tube 57. Through relative adjustment of the pump drives to obtain the desired readings on the flow meters, the oil and caustic solution can be delivered to the supply pipes in the required proportions with extreme exactness, a feature which is of great importance in securing the most efficient results.

Through any suitable source of rotary power, not shown, belted to pulley 32, head 36 is rapidly driven, for example, at a speed of 13,000 R. P. M. Since the centrifugal force developed at such a speed tends to entrain considerable air through the open top of basket 39, it is desirable in some situations to control this entrainment and for this purpose I may provide a disc 84, Figure 1, adjustably fixed on the lower portion of tube 49 in overlying relation to basket 39. The disc can be adjusted so closely to the basket as to substantially prevent any entrainment of the atmosphere in the chamber, but preferably is always maintained out of frictional contact with the basket. With the head driven and the supply pumps in operation, the caustic solution will be sprayed into the basket 41 and the oil will be sprayed into the basket 39 and, with the nozzles adjusted as shown, the caustic solution will be delivered in basket 41 in a circumferential zone spaced axially below the zone of circumferential delivery of the oil in basket 39. In passing through the slots of basket 41 under centrifugal force, the caustic solution is atomized and passes to and through lower openings of basket 39 below and entirely out of contact with the oil being delivered in the latter. The delivered oil is atomized in passing through the apertures of basket 39 and outwardly of the latter the separate strata of oil and caustic solution mists or aerosols are merged and subjected to a violent and thorough beating mixing action by blades 44 and the mixture is further acted on by the blades 45 as the mixture is expelled from the head under centrifugal force. The separately fed substances have been subjected to a violent cutting, or chopping, and mixing action in the head and have been instantaneously converted into a homogeneous mist-mixture and it is believed that the reaction between the oil and caustic has been completed by the time the mixture has been expelled from the head.

In any event it is known to be complete by the time the mist-mixture reaches the wall 18. The mist collects as a liquid emulsion on the wall 18 and the latter is so heated that a breaking temperature (ordinarily around 140° F.) has been imparted to the emulsion by the time it reaches the bottom wall 17. The latter is provided with an opening 85 through which the emulsion is immediately led, particularly in the case of crude oil refining, directly to separating means, such as a centrifuge. The flow from the chamber 15 to the centrifuge, in the case of crude oil refining, is preferably effected by gravity with the least possible agitation.

For the best results, the nozzles must be centered for uniform peripheral distribution in the baskets, and the delivered quantities must be accurately proportioned. These matters can be taken care of by the various adjustments heretofore discussed. Furthermore, once the mist-mixture has been formed it should be kept completely out of contact with any incoming unmixed constituent. This latter requirement is taken care of by the fact that upon delivery the substances are instantaneously and totally entrained in their respective baskets, and during mixing they are confined between the top and bottom walls of the head. The mist-mixture is centrifugally expelled away from the fed substances with such force that there is no tendency whatever for it to bypass back to the head intake, and any such tendency would, in any case, be overcome by the baffle disc 84 when adjusted closely to the basket 39 to seal off the space between the latter and tube 49.

With an eight inch head, rotating at 13,000 R. P. M., the discharge from the nozzles is misted, mixed, and expelled from the periphery of the head in about 1/100 of a second. A satisfactory diameter for the reaction chamber is four feet.

I have discovered that impurities in cottonseed oil, such as gummy constituents and coloring matter, carry electrical charges which are positive. In order to be able to throw these particles out of suspension, it is first necessary to render them electrically neutral. The soap formed as a result of the reaction of the caustic with the free fatty acids in the oil is negatively electrically charged, and insofar as the soap particles are of comparable size to the particles in the oil, the latter will be electrically neutralized and thrown out of suspension.

In prior processes of refining by liquid mixing, the soap particles resulting from the saponification of the free fatty acids are relatively large and due to size disparity, are ineffective to render electrically neutral particles in the oil which are of colloidal proportions. In these prior processes a substantial excess of caustic over that theoretically required to neutralize the free fatty acids is used for the purpose of saponifying neutral oil. The actual reason for this saponification of neutral oil, while heretofore not understood, is that the soap thus formed has charged particles of a size to neutralize the colloidal particles in the oil.

According to my process, when the oil and caustic are mixed as mists, i. e., aerosols, the particles of the soap resulting from the saponification of the free fatty acids are themselves effective to coact with the colloidal particles in the oil whereby to render the latter electrically neutral. Consequently, in the refining of crude cottonseed oil, I do not rely at all upon the saponification of neutral oil for effective color reduction. I do, however, use a slight excess of caustic beyond that theoretically required to neutralize the free fatty acids, but this is solely for the purpose of maintaining the pH, for I have found that otherwise the particles which have been electrically neutralized will tend to dissolve in the oil. As a general rule, I use an excess of caustic of about 0.2%. Since I avoid any substantial saponification of the neutral oil, whereas prior practices demand it, very material savings are effected by my mist-mixing procedure. These savings increase as the proportion of free fatty acids in the oil being refined increases, this for the reason that I am able to use the same slight excess of caustic regardless of the free fatty acid content, whereas in prior practices the excess of caustic has to increase as the fatty acid content increases, and, as a result, the proportion of neutral oil which is saponified also increases.

Of course, in the atomizing and mixing head which has been above described, the number of mixing rings can be varied. As a general rule, they will be fewer in a head especially designed for use in the refining of crude oil than in the case of a head especially designed for use in re-refining.

In Figure 3, I have shown a head, generally indicated by the reference numeral 86, which is of somewhat simplified construction and adapted for general usage. In this case, the bottom disc 87 carries a basket 88 which in turn carries a basket 89. An annulus 90 is engaged around the upper portion of basket 88 and a series of blades 91 are engaged between the outer edges of disc 87 and annulus 90. The annulus is secured to the disc through a number (e. g., four) of bolts 92 and spacers 93 which surround the bolts. The oil tube 94 is substantially the same as before and has a bottom flare 95 overlying the basket 89, the tube being centered relative to the head by means of the supporting screws 96. The caustic solution tube 97 has threaded on its lower end a fitting 98 which includes a flare 99 cooperating with the flare 95 to provide an adjustable nozzle with a circumferential spray opening adapted to produce a hollow-cone spray or film. Tube 97 is vertically adjustable as the tube 57 of Figure 1, and is adapted to be accurately centered relative to tube 94 by means of screws 100 radially threaded in tube 94. Threaded in the lower end of tube 97 is a nozzle 101 adapted to deliver a hollow-cone spray or film in the basket 89.

With the nozzles in the relative adjustment shown in Figure 3, they will deliver in separate upper and lower zones so that, as before, there will be no mixing until both substances have emerged from the basket 88 to be impinged together and thoroughly mixed by the beating action as they pass outwardly past the spacers 93 and blades 91.

While superior results are obtainable in some particulars when the substances are misted before mixing, it is entirely within the contemplation of the invention that the substances be merged or interspersed prior to atomization and mixing and in this connection attention is now directed to Figure 4.

In Figure 4 the structure is exactly the same as in Figure 3 except that the inner nozzle 102 delivers in a considerably flatter cone than the nozzle 101 of Figure 3, and basket 89 of Figure 3 has been removed. The relative adjustment of the two nozzles is such that the two sprays produced thereby intersect so that the substances are merged or intermingled prior to their entrainment by the basket 88 for atomization. In some cases this preliminary intermingling of the substances has been found to be of actual benefit as regards color removal, although the refining loss is somewhat greater than in the case of misting prior to mixing. As before, the separately fed substances are instantaneously converted into a homogeneous mist-mixture. Thus, by relative adjustment of the nozzles, or by appropriately selecting them according to delivery characteristics, the hollow cone sprays can be delivered to separate zones of the ring wall portions, or can be completely or partially merged prior to entrainment by the wall portions.

In Figure 5, reference numeral 103 designates a reaction chamber having a top opening rimmed by a neck 104 against which is clamped a top plate 105 by means of bolts 106. A tube 107 is passed centrally through the plate 105 and is supported and centered by means of screws 108 at the lower end of the yoke 109 which depends from plate 105. Passed through and secured in end caps of tube 107 are an oil supply pipe 110 and a supply pipe 111 for the caustic solution.

Reference numeral 112 (see also upper portion of Figure 6) designates generally a two-fluid nozzle comprising a body 113 having lateral inlets 114 and 115, the former running into an axial tubular portion 116 to the lower end of which is threaded a nozzle tip 117. Inlet 115 debouches into a chamber 118 having a bottom wall 119 provided with an axial opening in which is threaded a tube 120 in spaced concentric relation with tubular portion 116. The lower end of tube 120 has threaded therein a nozzle tip 121 terminating just inwardly of the lower end of tip 117, the tip 121 carrying spiral vanes 122 which center the tip 121 within the tip 117 and are adapted to impart a swirling motion to the passing liquid.

Through goose neck connections 123 and 124 the oil and caustic pipes are led into inlets 114 and 115, respectively, of the body 113 and support the latter exactly on the axis of an atomizing and mixing head, which may be the same as the head 86 of Figures 3 and 4, with the tip 117 extending somewhat within the basket 88.

Pipes 110 and 111 may be supplied by the means shown in Figure 2 with oil and caustic solution, the two substances being merged below tip 121 and emerging from tip 117 as a full cone spray which strikes basket 88 and is then reduced to mist form by passage through the apertured wall of the basket, intimate mixing being effected as the mists move to and past the periphery of the head. The results obtained by this arrangement are comparable to those obtained by the arrangement shown in Figure 4, the substances being preliminarily interspersed prior to mist-mixing.

Figure 6 shows a tubular extension 125 threaded on the tip 117. Threaded on the lower end of extension 125 is a slightly downwardly tapered fitting 126 in which is threaded a plug 127 having a central terminal bore 128 surmounted by an upwardly flared opening 129. In the use of the thus modified two-fluid nozzle, the nozzle is supported so that the plug 127 extends into the basket 88, Figure 5, a suitable distance, i. e., to the same extent as the tip 117 in Figure 5. By reason of the extension, the contact of the substances in liquid state is of longer duration, and there will be a somewhat greater interspersion of the two than when the extension is omitted. The reason for this is that the merged liquids are delivered as a hollow cone spray instead of a full cone spray. In the case of the full cone the degree of distribution may vary radially but is uniform about the axis of the cone.

Figure 7 shows a still simpler form of feeding device which is perfectly satisfactory in many situations. In this figure the oil supply pipe 130, supported in any suitable manner, is connected into a T 131 and a tubing length 132 is threaded into the T in alignment with pipe 130. Threaded on the lower end of tubing 132 is a fitting 126 which carries a plug 127, the fitting and plug being like those of Figure 6. The feed pipe 133 for the alkaline solution is threaded into the lateral opening of the T and may or may not have the illustrated tapered tip. This feeding device is supported relative to the atomizing head 86 in the same relationship discussed in connection with the nozzle of Figure 6, and will deliver a conical spray of the intermingled substances in the basket 88. If desired, this device may be further simplified by the omission of portions 126 and 127. In any event, as in Figures 5 and 6, the substances, which are separately flowed from the supply tanks are merged in a single flowing stream in which they are more or less finely distributed throughout each other.

Uniformity of the ultimate mist-mixture is secured in all cases, a result quite different from that which would be obtained if one substance were merely poured into a tank of the other with a supply pipe leading from the tank to the atomizer. Uniformity of the ultimate mixture would be impossible under the last-mentioned circumstances, since, even with agitation of the tank contents, it would be extremely difficult, if not impossible, to draw off the substances uniformly in predetermined proportions. Therefore, I continuously feed the substances from separate sources to the atomizing and mixing means in a sustained flow, with the substances separate until delivery to the atomizing and mixing means, or merged in advance thereof, but maintaining their original proportions up to the delivery point constituted by the atomizing and mixing means. Of course the original proportions are maintained in the atomizing and mixing means so that a continuously uniform homogeneous mist-mixture is discharged by the latter. The homogeneity of the mist-mixture is assured by the uniform distribution of the substances at the delivery point—specifically, their uniform distribution about the axis of the centrifugal atomizing and mixing means. Where the substances to be mixed are inert, they may be merged in a flowing stream at any convenient point in advance of the atomizing and mixing head. When the substances will react together chemically, the point of their merging should not be so far in advance of the head that major reaction of the substances will occur prior to their atomization.

In the re-refining of cottonseed oil, superior results can be obtained by forming the caustic alkali in the oil, rather than by adding it, as such, to the oil. In this connection, I may use, for example, any organic alkali metal compound which, reacting with water, will form a hydroxide of the metal. Where such a compound is soluble in a solvent, such as alcohol, for example sodium methylate which is soluble in methyl alcohol, it may be conveniently supplied as a solution for mist-mixing. In practice, a three-fluid nozzle, such as is shown in Figure 8, may be used for delivery to a mixing means such as an atomizer head.

Referring to Figure 8, the nozzle differs from that of Figure 5 by the provision of an additional inlet 134 which leads to a top chamber 135 having a bottom wall 136 provided with an axial opening in which is threaded a central tube 137 which extends in spaced concentric relation with the tube 120'. The tube 120' is extended somewhat as compared to the tube 120 of Figures 5 and 6, terminating just inwardly of the outer end of tip 117, and its nozzle tip is omitted. As shown in Figure 8, the tube 137 terminates just inwardly of the lower end of the tube 120' and has a nozzle formation. Tube 120' is accurately centered with respect to tubular portion 116' by means of radial screws 138, and tube 137 is accurately centered relative to tube 120' by means of the screws 139.

In the use of this nozzle the oil may be admitted by means of a pipe 140, the water by means of a pipe 141, and the sodium methylate solution by means of a pipe 142, in proper proportions. The nozzle may be related to an atomizer head in the manner shown in Figure 5.

With further reference to the nozzle of Figure 8, it may be mentioned that where only two substances are to be mixed but an increased disintegrating effect is desired at the nozzle, a suitable gas under suitable pressure may be introduced through one of the nozzle tubes. Any two of the nozzle tubes can be used for the substances to be mixed and the third for the disintegrating gas. The gas may be inert or may be chemically reactive with one or both of the other substances. Of course, an increased number of substances to be mixed can be taken care of by increasing appropriately the number of delivery tubes in the nozzle, and this applies also to the other types of delivery devices hereinbefore described.

The system shown in Figure 9 is adapted for various procedures in accordance with the invention. Tanks 144 and 145 are connected, through shut-off and regulating valves 146 and 147, into a common pipe 148 which leads to a vertical tube 149 corresponding to the tube 49 of Figure 1. Reference numeral 150 designates a tube corresponding to the tube 57 of Figure 1. These tubes have at their lower ends nozzles, for example, like those of Figure 1, adapted to deliver into a centrifugal atomizer or other suitable mixing mechanism in the reaction chamber 151. The upper end of tube 150 can be connected by means of a three-way regulating valve 152 either with a pipe 153 or pipe 154, the latter leading from a blower 155 to which finely pulverized material can be fed from a hopper 156. Reference numeral 157 designates the discharge pipe for the reaction chamber, this pipe leading through a three-way valve 158 to a three-way valve 159 by means of which flow in pipe 157 can be directed to the centrifugal separator 160.

A branch 161 leads upwardly from the three-way valve 158 to the bottom of tank 162 which may be equipped with a steam jacket 163. Disposed adjacent the bottom of the tank is an agitating paddle 164 driven from an electric motor 165. A suction pipe 166 has a vertically adjustable extension 167 projecting downwardly in tank 162. Pipe 166 leads to a pump 168 of any suitable type, the pump being adapted to deliver through a pipe 169 to the three-way valve 159, and thence to the separator.

In the caustic refining of crude oil, the oil may be contained in tank 145 and the caustic solution may be introduced through pipe 153 in proportions as controlled by the adjustment of the valves. The outflow from the reaction chamber will preferably be led directly to the separator, valves 158 and 159 being suitably adjusted for this purpose. In re-refining, however, valve 158 can direct the outflow into tank 162, paddle 164 being driven so as to exert a down-pull on the liquid in the tank so that the liquid is agitated and formation of a top layer of soap froth is impeded. The extension 167 is adjusted so that its lower end is below the liquid level in the tank and the liquid is withdrawn by pipe 168 and passed to the separator, valve 159 being adjusted for this purpose. In original refining, it is assumed that the walls of the reaction chamber are heated as described in connection with Figure 1, but in re-refining, the reaction chamber may be unheated and heat may be applied at some other point, for example to the liquid in tank 162 by means of steam circulated in jacket 163. Provision of the tank 162 is for the purpose of interpolating a delay between the disintegration of the substances and their separation in the separator, so as to permit the refining agent to be consumed to such a point that only a one layer soap stock will be formed.

Tank 145 may contain substantially dry unclarified refined oil and tank 144 may contain, for example, a solution of sodium methylate in methyl alcohol. The two may be admitted in regulated proportions to tube 149 and water for the reaction can be supplied through pipe 153 to tube 150. If the oil, on the other hand, has a sufficient water content, it may be delivered alone from tank 146 to tube 149 and the sodium methylate solution may be supplied through pipe 153 to tube 150.

Instead of sodium methylate solution, sodium carbide may be used as the agent to react with water to form caustic soda in the oil. In this case the sodium carbide, in finely divided form, is contained in the hopper 156 and the oil may be in tank 145 and may have had additional water added to it if necessary. In the case of added water, a colloid mill may be used to create a fine dispersion of the water in the oil. With the oil admitted to tube 149, valve 152 is adjusted to connect tube 150 with pipe 154 and the blower 155 is operated so that the powdered sodium carbide is fed, highly dispersed in air, to the mixing instrumentality in chamber 151 to form a mist-mixture with the oil.

As stated at the outset, the invention is of unlimited applicability so far as the nature of the substances to be mixed is concerned and, consequently, I shall not endeavor to enumerate the various fields in which the invention may be advantageously put to use. I may mention, however, the bleaching of oil with fuller's earth, the fuller's earth being fed to the mixing device as a suspension of dust in any non-oxidizing gas such as nitrogen, natural gas, carbon dioxide, etc., where oxygen would be detrimental. Where an oxidizing action is not detrimental, air can be used as the suspension medium for the fuller's earth or other dust. In this connection, it may be mentioned that no matter how fine the solid may be ground, the particles tend to form clusters, but these clusters will be disintegrated into separate particles by the intense action of centrifugal atomizers such as have been described herein. The same considerations apply to the mixing of a paint pigment with its vehicle. As another example, more efficient hydrogenation can be accomplished by my mist-mixing process. Glyceride oils and fats can be split into glycerine and fatty acids by mist-mixing the oil or fat and high temperature water, preferably with a catalyst. In the petroleum industry, my mist-mixing procedure finds application, for example, in the recovery of toluene from gasoline, in the treatment of oils with sulphuric acid, in the solvent extraction of lubricating oil, and in the emulsion polymerization in the manufacture of Buna rubber. Still another illustration of the uses of the method and apparatus is in the production of colloidal sulphur by mixing a water solution of sulphur dioxide in mist form with hydrogen sulphide. Of course, where one of the substances to be mixed is a gas, the atomizing head exerts merely a mixing action as to that substance.

When gases are mixed that do not react under the conditions existing at the time of mixing, a uniform mixture of the gases is obtained without any difficulty because of the molecular motion of the gas molecules. However, when gases are mixed which react immediately upon contact, a quite different situation is presented. The results under these conditions are analogous to liquid mixing in that a uniform reaction does not occur. Under the present invention the difficulties heretofore arising from uneven dispersion of gas in gas, as well as liquid in liquid, etc., are avoided and, consequently, it will be seen that the invention is of importance in meeting any problem of fluid mixing.

When liquids are subdivided so that the droplets formed have a radius of $1.6 \times 10^{-7}$ cm. or less, the vapor pressure of the liquid increases rapidly so that, in the case of water, the vapor presure, when in the form of a droplet having a radius of $0.67 \times 10^{-7}$ cm., is about five times that of water from a plane surface. This increase in vapor pressure is probably due to greater molecular motion, which, I believe, is reflected in increased chemical activity. By producing mists of liquids composed of droplets or particles having a radius of $1.6 \times 10^{-7}$ cm. or less, chemical activity is increased to such an extent that reactions can be made to occur between liquids mixed in this mist form at a rate greater than will occur when the liquids are mixed as liquids under the same temperature and pressure conditions. By producing a rate of reaction due to mechanical sub-division, rather than by heat, the secondary reactions which sometimes occur may be eliminated or reduced to a minimum, especially when speed of separation of the reaction products and non-contact of fresh material with the reaction products is considered. This increase in vapor pressure also occurs when solids are subdivided. That there is an increase in the chemical activity by the fine subdivision of solids is illustrated by the fact that the heat of solution of a fine powder is greater than that of coarser powder of the same substance.

In the preferred practice of the present invention I contemplate the reduction of a substance, such as a liquid, for mixing with any other substance similarly reduced, or a gas, to droplet or particle size of a radius of $1.6 \times 10^{-7}$ cm., and of as much smaller radius as is feasible. The centrifugal atomizing heads herein disclosed are capable of producing this order of subdivision, and, of course, of doing so simultaneously in the case of a plurality of substances which are reducible.

It will be understood that the specific disclosures herein are not to be taken as restrictive, but as illustrative. The invention includes all variations falling within the scope of the following claims. This application is a continuation-in-part of my application Serial No. 349,990, filed August 2, 1940.

The refining procedure, particularly as regards vegetable and animal oils, described herein by way of example, is claimed in my copending application Serial No. 432,719, filed February 27, 1942.

I claim:

1. The method of treating a plurality of substances, which comprises separately projecting them circumferentially of a common axis to disintegrate them separately into mists before contact with each other, impinging the mists together with a beating action in an annular zone so that the two are intimately mixed, centrifugally expelling the mixture circumferentially of said annular zone, and receiving the mixture on a collecting surface disposed in its path of expulsion.

2. The method of treating a plurality of substances, which comprises separately projecting them circumferentially of a common axis to disintegrate them separately into mists before contact with each other, impinging the mists together with a beating action in an axially confined centrifugal mixing zone so that the two are intimately mixed, centrifugally expelling the mist mixture circumferentially of said zone, and receiving the mixture on a collecting surface disposed in its path of expulsion.

3. Apparatus for treating a plurality of substances which will react chemically with each other, comprising a centrifugal atomizing and mixing head; means for leading the substances separately from separate sources of supply in regulated proportions, merging them, and delivering them to said head axially of the latter with uniform distribution of the substances about the axis of said head; said head being adapted to atomize and intimately mix therein the substances received from said tubular means and centrifugally expel the mist-mixture circumferentially of the head, and a collecting surface arranged to receive the expelled mist-mixture, the point of merging of the substances being so spaced from the head that the time of contact of the substances between their merging and their atomization and mixing is insufficient to allow major reaction thereof to occur prior to their mixing in atomized condition.

4. Apparatus for treating a plurality of substances, comprising a centrifugal atomizing and mixing head, means for delivering a spray of one substance coaxially within a hollow spray of another substance, said sprays being directed to the said head on the axis of the latter; the head being arranged to directly receive and atomize the sprays, mix the atomized substances therein, confine the atomized substances against escape during such mixing, and expel the mixture circumferentially; and a collecting surface arranged to receive the expelled mist-mixture.

5. Apparatus for treating a plurality of substances, comprising a centrifugal atomizing and mixing head, means for delivering a spray of one substance within and into a hollow spray of another substance to intersperse the two, the interspersed sprays being directed toward said head on the axis of the latter; the head being arranged to directly receive and atomize the spray, mix the atomized substances therein, confine the atomized substances against escape during such mixing, and expell the mixture circumferentially; and a collecting surface arranged to receive the expelled mist-mixture.

6. Apparatus for mixing a plurality of substances, which comprises a plurality of concentric rotatable radially apertured rings, means for rotating the rings at high speed, a nozzle positioned to discharge one substance into the innermost central ring and another substance into the adjacent concentric ring in a delivery zone spaced axially with respect to the delivery zone in the said innermost ring, whereby high speed rotation of the rings will centrifugally force the respective substances separately through the apertures of the rings whereby the substances are atomized, and circularly traveling mixing means for the atomized substances rapidly rotatable on the axis of said rings.

7. Apparatus for mixing a plurality of substances, which comprises a plurality of concentric rotatable radially apertured rings, means for rotating the rings at high speed, a nozzle adapted to discharge one substance into the innermost central ring and another substance circumferentially into the adjacent concentric ring in a delivery zone spaced axially with respect to the delivery zone in the said innermost ring, whereby the respective substances are moved through the apertures of the rings by centrifugal force for atomization, and means for receiving and intimately commingling the atomized substances.

8. Apparatus for mixing a plurality of substances, which comprises a plurality of concentric rotatable radially apertured rings mounted for rotation about a vertical axis, means for rotating the rings at high speed, a nozzle adapted to discharge one substance circumferentially into the innermost central ring and another substance circumferentially into the adjacent concentric ring, the first substance impinging against the innermost central ring at a level substantially lower than the level at which the second substance impinges against the wall of the adjacent concentric ring, whereby the respective substances are moved by centrifugal force through the apertures of the rings at different levels for atomization, and means for receiving and intimately commingling the atomized substances.

9. Apparatus for mixing a plurality of substances, which comprises three concentric rotatable radially apertured rings, means for rotating the rings at high speed, means for discharging one substance into the innermost ring and means for discharging another substance into the intermediate ring in a delivery zone spaced axially with respect to the delivery zone in the said innermost ring, whereby the respective substances are atomized separately by movement through the apertures of the central and intermediate rings and the separately atomized substances are then moved through the apertures of the outermost ring for mixing.

10. In a device for centrifugally atomizing and then intimately mixing a plurality of substances, a member mounted for rotation about a vertical axis and provided with a central material-receiving space, a ring defining said material-receiving space, a second material-receiving space surrounding said ring and a second concentric ring defining the second material-receiving space, each of said rings having a plurality of closely spaced radial openings positioned to receive material from the respective material-receiving spaces and to atomize and discharge the material radially by centrifugal force developed as the result of rapid rotation of the rings, means for receiving and mixing the atomized materials, downwardly extending material-feeding means including a central tube for delivering material to the first-mentioned innermost material-receiving space, a flared member at the lower end of said central tube, a second tube outwardly of and concentric with the first tube and terminating in a flared member concentric with and extending over the first-mentioned flared member, the two flared members being normally spaced from each other and disposed so as to discharge material fed between said tubes into the second material-receiving space in the form of a hollow cone.

11. Apparatus for mixing a plurality of substances, comprising a plurality of rotatable coaxial rings provided with radial apertures, means for delivering the substances separately within the rings respectively in axially spaced delivery zones, a rotatable radially perforated ring outwardly of the first named rings, means defining an annular passage between said first named rings and said outward ring; and means for rapidly rotating said rings so that the substances will be centrifugally expelled and atomized through the apertures of said first named rings, will be impinged together in said passage, and the combined atomized substances will be expelled with a mixing action through the apertures of said outward ring.

12. Apparatus for mixing a plurality of substances comprising means for separately atomizing the substances, means for separately supplying the substances to said atomizing means for separate misting before contact with each other, means for closely confining the mists, and means immediately operative to intimately mix the confined mists together.

13. Apparatus for mixing a plurality of substances, comprising a plurality of coaxial radially apertured rings, means for rapidly rotating said rings, means for delivering the substances separately to said rings in axially spaced zones so that the substances will be centrifugally forced through the apertures of the respective rings and atomized prior to contact with each other, and means defining a confined chamber wherein the atomized substances are immediately received for mixing, said chamber having an opening through which the mixed substances are immediately discharged under centrifugal force.

14. Apparatus according to claim 13 wherein the delivery means for at least one of the substances comprises a nozzle having a circumferential spray opening coaxial with the rings and affording a circumferential delivery zone in the associated ring.

15. Apparatus for mixing a plurality of substances, comprising inner and outer radially apertured concentric rings, means for rapidly rotating said rings, means for delivering one substance into the inner ring, means for delivering another substance in a circumferential spray into the outer ring, each substance being centrifugally forced through the apertures of the ring into which it is delivered and thus atomized and the substance delivered into the inner ring being subjected to a second action in passing through the apertures of the outer ring, and means immediately outwardly of the outer ring for intimately mixing the atomized substances.

16. Apparatus for mixing a plurality of substances, comprising a plurality of rapidly rotatable circular wall portions which are coaxially related and radially apertured, means for delivering the substances separately within the wall portions respectively in axially spaced circumferential zones, and rapidly rotatable circular mixing means concentric with said wall portions outwardly thereof and in the path of the substances emerging separately from the wall portion apertures under centrifugal force.

17. Apparatus for mixing a plurality of substances, comprising a plurality of rapidly rotatable circular wall portions which are coaxially related and radially apertured, means for delivering the substances separately within the wall portions respectively in axially spaced circumferential zones, rapidly rotatable circular mixing means concentric with said wall portions outwardly thereof and in the path of the substances emerging separately from the wall portion apertures under centrifugal force, and axially spaced confining walls between the wall portions and the mixing means and between which the substances pass to the mixing means.

18. Apparatus for mixing a plurality of substances, comprising inner and outer rapidly rotatable radially apertured concentric rings, means for delivering the substances separately within the rings respectively in axially spaced circumferential zones so that each substance will be centrifugally forced through the apertures of the ring into which it is delivered and the substance delivered into the inner ring will be additionally centrifugally forced through the apertures of the outer ring, and rapidly rotatable circular mixing means concentric with said rings outwardly of the outer ring and in the path of the substances emerging separately from the apertures of the outer ring.

19. Apparatus for mixing a plurality of substances, comprising inner and outer rapidly rotatable radially apertured concentric rings, means for delivering the substances separately within the rings respectively in axially spaced circumferential zones so that each substance will be centrifugally forced through the apertures of the ring into which it is delivered and the substance delivered into the inner ring will be additionally centrifugally forced through the apertures of the outer ring, rapidly rotatable circular mixing means concentric with said rings outwardly of the outer ring and in the path of the substances emerging separately from the apertures of the outer ring, and axially spaced confining walls between the outer ring and the mixing means and between which the substances pass to the mixing means.

20. Apparatus for mixing two substances of which one is a gas, comprising means for separately projecting the substances circumferentially of a common axis and for atomizing the other substance, and circularly traveling mixing means rapidly rotatable on said axis and in the path of the projected substances.

21. Apparatus for mixing two substances of which one is a gas, comprising means for separately projecting the substances circumferentially of a common axis and for atomizing the other substance, circularly traveling mixing means rapidly rotatable on said axis and in the path of the projected substances, and axially spaced confining walls between which the projected substances pass to the mixing means.

22. Apparatus for mixing a plurality of substances comprising inner and outer radially apertured concentric rings mounted for rapid rotation, means for delivering one of the substances into the inner ring, a nozzle having a circumferential spray opening coaxial with the outer ring and adapted to deliver another substance in a circumferential zone in the outer ring, and mixing means surrounding the outer ring.

23. Apparatus for mixing a plurality of substances comprising a pair of coaxially arranged nozzles each adapted to produce a circumferential spray, and centrifugal means coaxial with said nozzles operative to receive, atomize and mix the sprayed substances and expel the mixture circumferentially.

24. Apparatus for mixing a plurality of substances, comprising a centrifugal atomizing and mixing head rotatable on a vertical axis, said head including an inner ring having radial perforations, a bottom wall for said ring, an outer ring concentric with the first and having radial perforations, top and bottom annular walls extending between said rings, a circularly arranged series of tie bolts connecting said walls between said rings, and means for feeding a plurality of substances into the inner ring.

25. Apparatus for mixing a plurality of substances comprising a centrifugal atomizing and mixing head, said head including a plurality of concentric rings having radial perforations, annular walls joining the ends of said rings, means for feeding a plurality of substances to the innermost ring coaxially therewith and in uniform distribution about the ring axis, and means for supplying the substances separately to said feeding means.

26. The method of accelerating the rate of reaction, beyond that ordinarily obtainable under the same conditions of temperature and pressure, between a plurality of substances which will react chemically with each other and of which at least one is not a gas, said method comprising continuously feeding the substances from separate sources of supply in regulated proportions and delivering them with uniform distribution, subjecting the delivered non-gaseous substance or substances to an atomizing action to reduce the same to a state of sub-division in which the particles have a radius of $1.6 \times 10^{-7}$ cm. or smaller, and mixing all the substances together, while confining them, to form a homogeneous mist mixture, and collecting the mixture on a surface.

27. The method of treating a plurality of substances, comprising continuously feeding the substances from separate sources of supply in regulated proportions with sustained flow, maintaining the original proportions of the substances up to a delivery point and delivering them with uniform distribution at said point, subjecting the substances at said point to an atomizing and mixing action whereby they are immediately converted into a homogeneous mist mixture, confining the substances during mixing so that the entire delivered quantities thereof are present in the mixture, directing the mixture away so that when once formed it has no contact with any incoming substance, and receiving the mist mixture on a collecting surface.

28. The method according to claim 27 wherein the substances are maintained separate until atomized.

29. The method according to claim 27 wherein the substances are merged prior to atomization.

30. The method according to claim 27 wherein the substances are such as to react chemically with each other, and wherein they are merged prior to atomization but not sufficiently prior thereto to allow major reaction thereof to occur prior to their mixing in atomized condition.

31. Apparatus for treating a plurality of substances, comprising a centrifugal atomizing and mixing head, tubular means arranged coaxially with the head for delivery thereto, means for leading the substances separately from separate sources of supply in regulated proportions to said tubular means, said tubular means being adapted to deliver the substances with uniform distribution thereof about the axis of the head, said head being adapted to atomize and intimately mix therein the substance received from said tubular means and centrifugally expel the mist mixture circumferentially of the head, and a collecting surface arranged to receive the expelled mist mixture.

32. Apparatus for treating a plurality of substances, comprising a centrifugal atomizing and mixing head, a spray device arranged for coaxial delivery to said head and comprising concentric tubular members of which one delivers within the other, means for leading the substances separately from separate sources of supply in regulated proportions to said tubular members respectively, said head being adapted to atomize and intimately mix therein the substances received from said tubular members and centrifugally expel the mist mixture circumferentially of the head, and a collecting surface arranged to receive the expelled mist mixture.

33. The method of treating a plurality of substances of which one is a gas, comprising continuously feeding the substances from separate sources of supply in regulated proportions with sustained flow, maintaining the original proportions of the substances up to a delivery point and delivering them with uniform distribution at said point, subjecting the other than gas substance at said point to an atomizing and mixing action whereby said other substance is immediately converted to a mist and immediately mixed with the gas to produce a homogeneous mist-gas mixture, confining the substances during mixing so that the entire received quantities thereof are present in the mixture, directing the mixture away so that when once formed it has no contact with any incoming substance, and receiving the mixture on a collecting surface.

34. The method of treating a plurality of substances, which comprises continuously feeding the substances in regulated proportions from separate sources of supply and delivering them with uniform distribution, subjecting the delivered substances in a fraction of a second to both a violent disintegrating action and a succeeding violent beating action whereby to convert the substances to a continuously uniform homogeneous mist-mixture, and collecting the mixture on a surface.

35. The method of treating a plurality of substances of which one is a gas, which comprises continuously feeding the substances in regulated proportions from separate sources of supply and delivering them with uniform distribution, upon delivery subjecting the other than gas substance to a rapid and violent disintegrating action and both to an immediately succeeding rapid and violent beating action so that in a fraction of a second the substances are converted to a continuously uniform homogeneous mist-gas mixture, and collecting the mixture on a surface.

36. Apparatus for mixing a plurality of substances, comprising means for leading the substances from separate sources of supply in regulated proportions and delivering them with uniform distribution, means for projecting the delivered substances circumferentially of a common axis and for atomizing them, and circularly traveling mixing means rapidly rotatable on said axis and in the path of the projected substances.

37. Apparatus for mixing a plurality of substances, comprising means for leading the substances from separate sources of supply in regulated proportions and delivering them with uniform distribution, means for projecting the delivered substances circumferentially of a common axis and for atomizing them, circularly traveling mixing means rapidly rotatable on said axis and in the path of the projected substances, and axially spaced confining walls between which the projected substances pass to the mixing means.

38. Apparatus for treating a plurality of substances of which one is a gas, comprising a centrifugal atomizing and mixing head, tubular means arranged coaxially with the head for delivery thereto, means for leading the substances separately from separate sources of supply in regulated proportions to said tubular means; said tubular means being adapted to deliver the substances with uniform distribution thereof about the axis of the head; said head being adapted to atomize the other than gas substance, intimately mix the substances therein, and centrifugally expel the mist-gas mixture circumferentially of the head, and a collecting surface arranged to receive the expelled mixture.

39. Apparatus for mixing a plurality of substances of which one is a gas, comprising a centrifugal atomizing and mixing head, a device arranged for coaxial delivery to said head and comprising concentric tubular members of which one delivers within the other, said device including means for delivering the other than gas substance as a spray, means for leading the substances separately from separate sources of supply in regulated proportions to said tubular members respectively; said head being adapted to atomize the other substance, intimately mix the substances therein, and centrifugally expel the mist-gas mixture circumferentially of the head; and a collecting surface arranged to receive the expelled mixture.

40. Apparatus for treating a plurality of substances, comprising a centrifugal atomizing and mixing head, tubular means arranged coaxially with the head for delivery thereto, means for leading the substances separately from separate sources of supply in regulated proportions to said tubular means, said tubular means being adapted to deliver the substances with uniform distribution thereof about the axis of the head, said head being adapted to atomize and intimately mix therein the substances received from said tubular means and centrifugally expel the mist mixture circumferentially of the head, a collecting surface arranged to receive the expelled mist mixture, and means for conditioning the temperature of said collecting surface.

RALPH H. FASH.